United States Patent
Siggers et al.

(10) Patent No.: US 10,268,574 B2
(45) Date of Patent: Apr. 23, 2019

(54) DEPLOYMENT TESTING FOR INFRASTRUCTURE DELIVERY AUTOMATION

(71) Applicant: salesforce.com, inc., San Francisco, CA (US)

(72) Inventors: Ben Matthew Siggers, Burnaby (CA); Michael Collins, Vancouver (CA)

(73) Assignee: salesforce.com, inc., San Francisco, CA (US)

( * ) Notice: Subject to any disclaimer, the term of this patent is extended or adjusted under 35 U.S.C. 154(b) by 120 days.

(21) Appl. No.: 15/255,065

(22) Filed: Sep. 1, 2016

(65) Prior Publication Data

US 2018/0060226 A1     Mar. 1, 2018

(51) Int. Cl.
G06F 11/00 (2006.01)
G06F 11/36 (2006.01)

(52) U.S. Cl.
CPC ...... G06F 11/3692 (2013.01); G06F 11/3684 (2013.01); G06F 11/3688 (2013.01)

(58) Field of Classification Search
CPC ..... G06F 8/60; G06F 11/3684; G06F 11/3688
See application file for complete search history.

(56) References Cited

U.S. PATENT DOCUMENTS

| | | | |
|---|---|---|---|
| 5,371,883 A * | 12/1994 | Gross | G06F 11/3688 714/38.1 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |

(Continued)

*Primary Examiner* — Jason B Bryan
(74) *Attorney, Agent, or Firm* — Sterne, Kessler, Goldstein & Fox P.L.L.C.

(57) ABSTRACT

The disclosed deployment testing system includes a test loader that loads and parses test objects and the antecedent test objects on which the selected test object depends, to prepare a test sequence. A database of test objects apply to one or more SUT and specify aspects of deployed SUT configuration that include hardware configuration, active connection of the SUT to other network devices, configuration of the actively connected network devices to accept access by the SUT, presence of files and applications in storage, and services running on the SUT; identify dependencies on antecedent test objects; specify test object features that extend object features found in the antecedent test objects; and override test parameter values in the antecedent test objects. A test executor obtains administrative credentials for accessing and testing a SUT and uses the test and antecedent test objects to verify the SUT; and a test reporter publishes tester results.

21 Claims, 9 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,607,203 B1 * | 12/2013 | Mehra ................ G06F 11/3688 717/124 |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 9,619,370 B1 * | 4/2017 | Gibson ............... G06F 11/3664 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0030654 A1 * | 2/2012 | Park .................... G06F 11/3684 717/124 |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

\* cited by examiner

700

| Check Name | Type | Service (Watchdog) | Roles |
|---|---|---|---|
| ACL-01 | connectivity.ACL | monitoring | mmrelay (superpod) |
| ACL-03 | connectivity.ACL | hub | hub (superpod) |
| ACL-04 | connectivity.ACL | mgmt_hub | mgmt_hub |
| ACL-10 | connectivity.ACL | splunk-forwarder | acs, app, cbatch, dapp. |
| ACL-11 | connectivity.ACL | splunk-forwarder | acs, app, cbatch, dapp. |
| ACL-12 | connectivity.ACL | splunk-forwarder | acs, app, cbatch, dapp. |
| ACL-13 | connectivity.ACL | monitoring | acs,app,cbatch,dapp,ffx |
| ACL-14 | connectivity.ACL | monitoring | acs,app,cbatch,dapp,ffx |
| ACL-24 | connectivity.ACL | core_app | app |
| ACL-25 | connectivity.ACL | monitoring | mmrelay (superpod) |
| ACL-26 | connectivity.ACL | monitoring | mgmt_hub |
| ACL-27/28 | connectivity.ACL | oracle_database | db, dgdb |
| ACL-31/32 | connectivity.ACL | monitoring | monitor |
| ACL-33 | connectivity.ACL | monitoring | monitor |
| UPC-01 | hostchecks.User | OS | app, acs, cbatch, etc. |
| MSC-09 | hostchecks.Backuppf | HW | db, ffx |
| BIOS-03 | console.Dellpower | HW | all |
| BIOS-03/05 | hostchecks.Dellhealth | HW | all |
| FSC-04 | hostchecks.Fssize | OS | all |
| FSC-05 | hostchecks.Mount | OS | all |
| BIOS-04 | console.Imlcmt | HW | all |
| BIOS-06 | hostchecks.Biosperf | HW | all |
| IB-01 | console.Existence | HW | all |
| HW-01 | hostchecks.Nofile | HW | all |
| OS-11 | hostchecks.Dbpathchk | HW | db |
| UPC-03 | hostchecks.User | OS | mgmt_hub |
| AFW-01 | crosschecks.Afwstatus | OS | all AFWized roles |

FIG. 7

DEPLOYMENT TESTING FOR INFRASTRUCTURE DELIVERY AUTOMATION

BACKGROUND

The laptops, workstations and servers that we have at home are pets. Large organizations that employ similar units by the hundreds or thousands need to deploy these resources as cattle, not pets.

Deployment is not realistically complete until successful system configuration has been verified. Unlike performance testing, which verifies that applications are meeting throughput and processing requirements, deployment testing verifies that deployed components are present in storage and services are present in memory with the expected configurations.

Continuing deployment presents a variety of special problems beyond initial deployment, including upgrade management and regression testing.

An opportunity arises for developing flexible tools for deployment testing and verification that can handle both initial deployment of the herds of cattle and ongoing deployment of improvements and upgrades to the herds. These tools are foundational building blocks for autonomous global data centers. Infrastructure delivery automation and improved user experience may result.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The disclosed deployment testing system can be coupled to a network and at least dozens of computer systems, and includes a test loader that loads a selected test object and all of the antecedent test objects on which the selected test object depends and that parses the loaded test objects to prepare a test sequence. A database of test objects apply to one or more systems under test (SUT) and specify aspects of deployed SUT configuration that include hardware configuration of the SUT, active connection of the SUT to other network devices, configuration of the actively connected network devices to accept access by the SUT, presence of files and applications in storage of the SUT, and services running on the SUT; identify dependencies on antecedent test objects, including any nested dependencies. The database of test objects also specify test object features that extend object features found in the antecedent test objects; and override test parameter values found in the antecedent test objects. An included test executor obtains administrative credentials for accessing and testing a SUT and uses a plurality of the test and antecedent test objects to verify that hardware configuration of the SUT, active connection of the SUT to other network devices, configuration of the actively connected network devices to accept access by the SUT, presence of files and applications in storage of the SUT, and services running on the SUT. A test reporter publishes tester results, for consumption, that satisfy criteria in the test and antecedent test objects. Some disclosed systems also include a subscriber service that accesses the published tester results for the SUT described by the configuration specification. In some implementations the system includes reporting the results to a watcher service on a client device.

The disclosed deployment testing system can enhance system delivery automation, as well as system modifications and upgrades; and can simplify service ownership by providing tools for service owners to use to create and define their own service deployment checks within a well-defined framework.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 7 is an excerpt of an aggregated list of validation checks, by name, type, service and roles.

DETAILED DESCRIPTION

Figure 1:
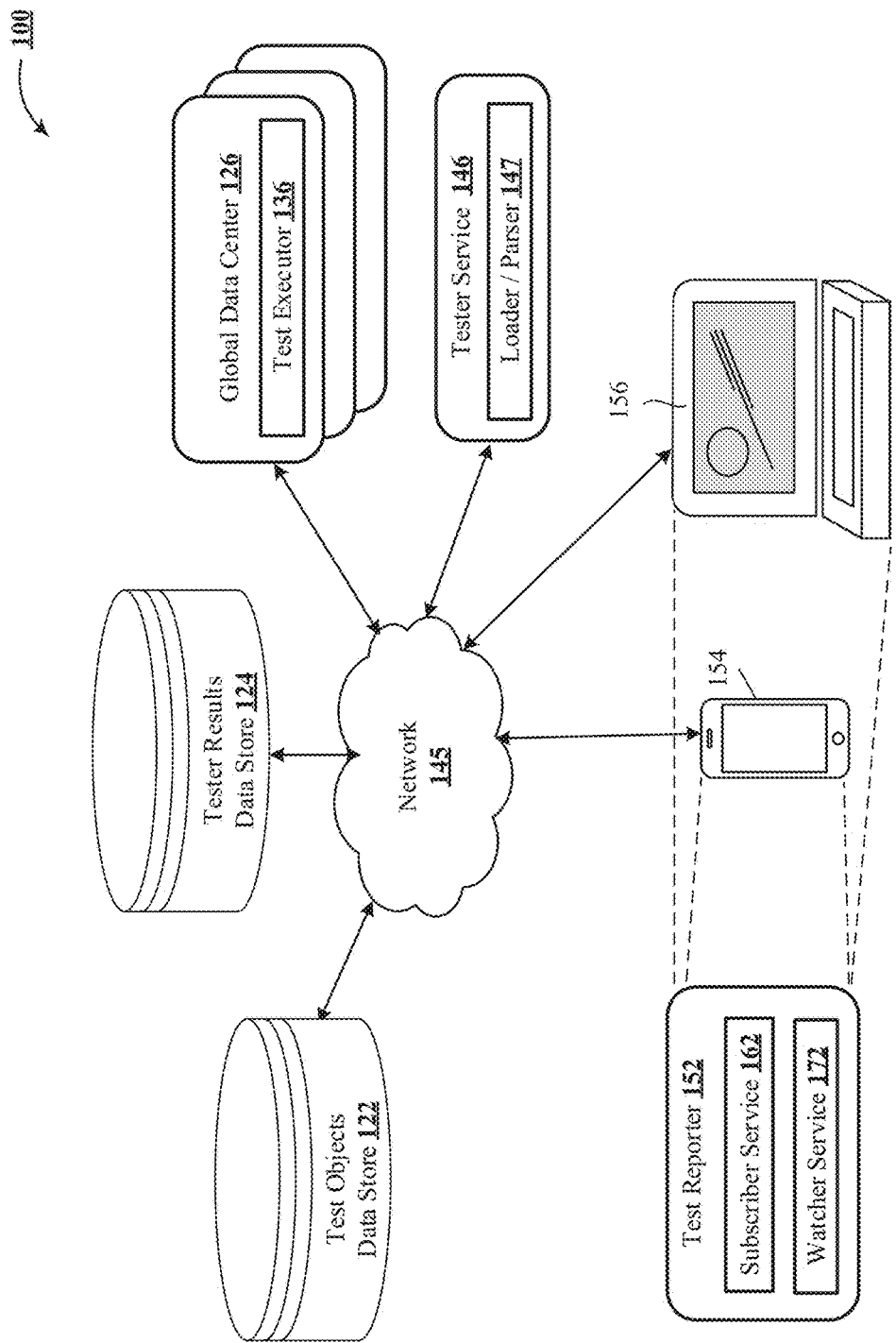
FIG. 1 depicts an environment for a deployment testing system.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Cloud services are built around the concepts of shared-nothing architecture, stateless file systems, configuration automation and repeatability. With the advent of virtualization, it is often easier to terminate problematic servers from the administration console and then relaunch a new server from a catalog of server images.

The difference between the pre-virtualization model and the post-virtualization model can be thought of as the difference between pets and cattle. Pets are given loving names, like Lulu or Lassie. They are unique and lovingly hand-raised—scaled up by making them bigger, and when they get sick, nursed back to health. Alternatively, cattle are given functional identification numbers like vm0017—they are almost identical to each other and are scaled out by getting more of them, and when one gets sick, replacing it with another one.

Acronyms used in this disclosure are identified the first time that they are used. These acronyms are terms of art, often used in standards documents. Except where the terms are used in a clear and distinctly different sense than they are used in the art, we adopt the meanings found in related standards. For the reader's convenience, many of them are listed here:
- ACL Access control list
- AFW Automation framework
- HCC Host command check
- HLC Host listener check
- iDB Inventory database
- NAG Nagios monitoring system check
- RPM RPM Package Manager
- SSH Secure shell (ssh) login check
- UAC User access check
- UPC User profile check Tools for deployment testing and verification are foundational building blocks for autonomous global data centers, and can handle both initial deployment of the herds of cattle and ongoing deployment of improvements and upgrades to the herds. In practice, deployment of large data centers includes a hierarchy of validations. For example, if a server is unhealthy, the services installed on the server will also be unhealthy.

Modern data centers are complex and their infrastructure also needs to be able to incorporate ongoing updates. Each distinct service in the data center includes many internal services. Each end user is connected to a point of deployment (POD) which includes twenty to thirty different roles, including web server, database server, logging metrics server, logging, metrics, and additional servers to index data and to batch process and transform customer data. A cluster in a data center hosts services shared among twenty different pods, including big data infrastructure on 100 K servers shared between those pods, analytics, and other big chunks of shared resources among all of the pods. Each of twenty pods will have multiple roles, including roles at the datacenter level and supporting infrastructure. Also included in the complexity are storage devices, network load balancers and firewalls, and tracking accounts for managing who can login to different servers, and operating system versions for supporting servers. Each app is a service including multiple functional roles. For example, an app role in which the core application is installed includes monitoring agents like Splunk, and an OS and hardware itself as a service. A database server has dB services, backups, and failover services roles. As data center managers build out infrastructure, they assign roles and set up firmware and install OS and the correct component apps for the server. The disclosed deployment testing system will aid in effective, accurate deployment and updates for these complex centers.

Different types of server infrastructure utilize different build processes, and can incorporate monitoring differences. An internal system for an enterprise can incorporate APIdriven automated server provisioning over the network, providing an API to control the servers in a rack for various functionality such as restart, inventory and installation of target images. Another type of server infrastructure can include a set of servers provisioned using an installation method to automatically perform unattended operating system installation and configuration. A third type of server infrastructure can utilize a hybrid that incorporates features of the first two server infrastructures described. That is, racks of servers can be installed using an automated installation and configuration method, and then can be managed using API-driven automated server provisioning over the network.

We describe a system and implementation of a deployment testing system, with reference to FIG. 1 which shows an architectural level schematic. Because FIG. 1 is an architectural diagram, certain details are intentionally omitted to improve the clarity of the description. Exemplary deployment testing system platform 100 includes global data center 126, tester service 146, test objects data store 122, test results data store 124, and test reporter 152. Additionally, the system includes network 145. Global data center 126 includes test executor 136 that dynamically loads the appropriate underlying validation modules referenced in the parsed checks for the system under test, and performs the checks using a validation API. Global data center 126 is described in detail infra, relative to FIG. 2. Test objects data store 122 includes definitions of hardware and application services that are monitored by the tester processes. These testable configurations can include nested dependencies. That is, test objects data store 122 can include specified test parameter values that extend other values found in the antecedent test objects for the aspects of system configuration. In some implementations, the services are described using a service definition object model (SDOM) that includes role memberships and dependencies between service objects, as described further infra.

Tester service 146 includes loader/parser 147 that loads a selected test object and all antecedent test objects on which the selected test object depends, and parses the loaded test objects to prepare a test sequence. Examples are described infra.

Deployment testing system platform 100 also includes test reporter 152 that includes subscriber service 162 that accesses the published tester results for the configuration specification given in the test objects; and watcher service 172 that receives reports of the published tester results for the SUT configuration specification given in the test objects. Test reporter can publish results on mobile device user interface 154 and computer device user interface 156. In some implementations, a rendering engine can transform the published tester results into rendered graphics.

A system under test (SUT) can include devices from a group consisting of but not limited to servers, application servers, databases, file systems, search services, and measurement instruments. Additional example configured tests for the SUT include apps and roles for monitoring, for logging metrics, and for indexing batched customer data.

In one implementation, deployment testing system 100 can be located in a cloud-computing environment which may be implemented as a multi-tenant database system. As used herein, the term multi-tenant database system refers to those systems in which various elements of hardware and software of the database system may be shared by one or more tenants. For example, a given application server may simultaneously process requests for a great number of tenants, and a given database table may store rows for multiple tenants.

In some implementations, the elements or components of deployment testing system 100 can be engines of varying types including workstations, servers, computing clusters, blade servers, server farms, mobile devices or any other data processing systems or computing devices. The elements or components can be communicably coupled to the databases via a different network connection. For example, global data center 126 can be coupled via the network(s) (e.g., the Internet), test reporter 152 can be coupled via a direct network link, and tester results data store 124 can be coupled by yet a different network connection.

In some implementations, databases used in deployment testing system 100 can store information from one or more tenants into tables of a common database image to form a multi-tenant database system. A database image can include one or more database objects. In other implementations, the databases can be relational database management systems (RDBMS), object oriented database management systems (OODBMS), distributed file systems (DFS), no-schema database management systems, or any other data storing systems or computing devices.

The disclosed deployment testing system 100 provides flexible tools for deployment testing and verification that can handle both initial deployment of the herds of cattle and ongoing deployment of improvements and upgrades to the herds. The tools can also enhance service ownership, making it possible for service owners to own, create and define their own service checks within a well-defined framework.

While deployment testing system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

In one implementation, the deployment testing system can include multiple global data centers, and can include superpods (SP) and points of deployment (PODs). Each pod can include hundreds or thousands of servers and can serve tens of thousands of customers with multi-tenant services. Use case examples are described infra.

Different types of server infrastructures utilize different build processes, and can incorporate monitoring differences. An internal system for an enterprise can incorporate API driven automated server provisioning over the network, providing an API to control the servers in a rack for various functionality such as restart, inventory and installation of target images. Another type of server infrastructure can include a set of servers provisioned using an installation method to automatically perform unattended operating system installation and configuration. A third type of server infrastructure can utilize a hybrid that incorporates features of the first two server infrastructures described. That is, racks of servers can be installed using an automated installation and configuration method, and then can be managed using API driven automated server provisioning over the network.

Figure 2:
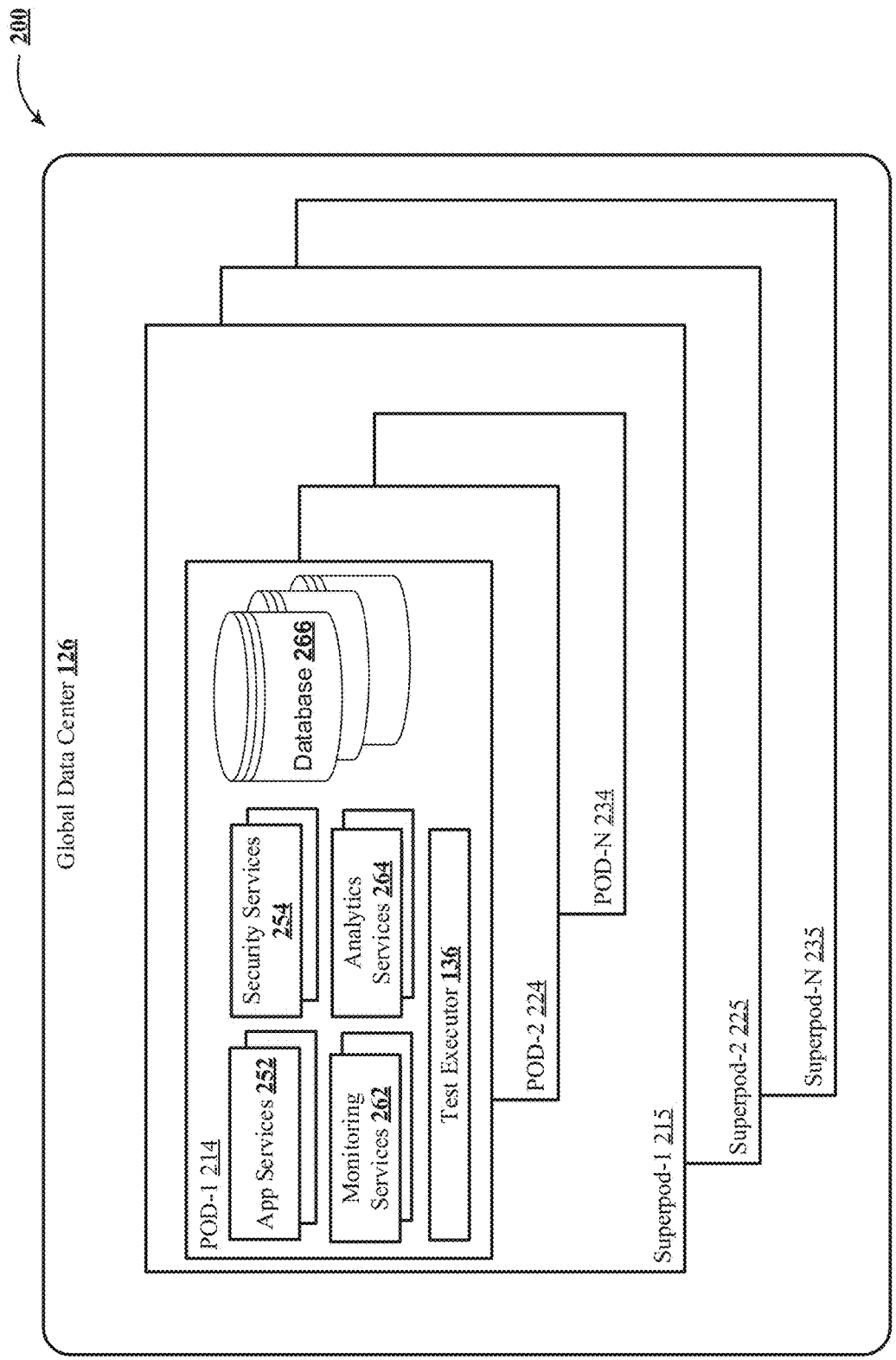
FIG. 2 illustrates a global data center usable with the deployment testing system example shown in FIG. 1, according to one implementation of the technology disclosed.

Global data center 126, shown in FIG. 2, includes superpods 215, 225 and 235, each of which includes similar components. Super-pod 215 contains POD 214, POD 224 and POD 234, and each POD includes a logical grouping of hosts, and includes test executor 136 that dynamically loads the appropriate underlying validation modules referenced in the parsed checks for the system under test, and performs the checks using a validation API. In one example, the deployment testing of a global data center infrastructure tracks one hundred pods using the disclosed deployment testing technology. POD 214 includes app services 252, security services 254, monitoring services 262, analytics services 264, and file system and database 266. In one implementation, a company allocates a customer to a single POD where their data resides. In common use, multiple customers rely on a single POD—a self-contained unit that contains everything required to run an instantiation of a company's services.

Multiple validation tests often need to be performed to ensure that a service is working correctly, each of which must return a simple healthy/unhealthy value. If one of these validations fails, the service is marked as unhealthy. A service may be dependent on other services. If one of the dependency services fails, the main service is also marked as unhealthy. All validations and dependent services must pass in order for the service to be healthy. If any of the validations or dependent services is marked unhealthy, the service itself is also marked as unhealthy. The validations and dependent service checks do not have an implied order of execution. Validation arguments may be specified for validation checks. The function of the arguments will depend on the type of validation check.

Predefined validation modules can be made available for common tasks. Example validation checks include access control list checks (ACL)—"can host X be reached on port Y?"; process checks—"is there a process running that matches this sequence of characters (regex)?"; host command check runs a specific command on a specific set of hosts; host listener check verifies from the host in question that a given port has a service accepting traffic (listening); inventory database (iDB) API contains the logical infrastructure equipment for running apps, including the list of data centers, clusters, physical server information (make, model, network interfaces, ports) and the asset location; user access check—ssh to the host in question and confirm that the specified directories belong to the correct user and group and have the correct permissions; user profile check—ssh to the host in question and confirm the presence of a username on the system—"does a required user id exist on this host?" Additional tests include a Nagios check of the monitoring system; a check of SCSI tuning and timeout settings on DB hosts; file content checks—"does the file contain the given pattern?" and firmware version checks—"does the firmware match the expected version?" New validation checks can also be created by service owners, in the form of plugins and can be developed, configured and integrated into the SDOM.

Figure 3:
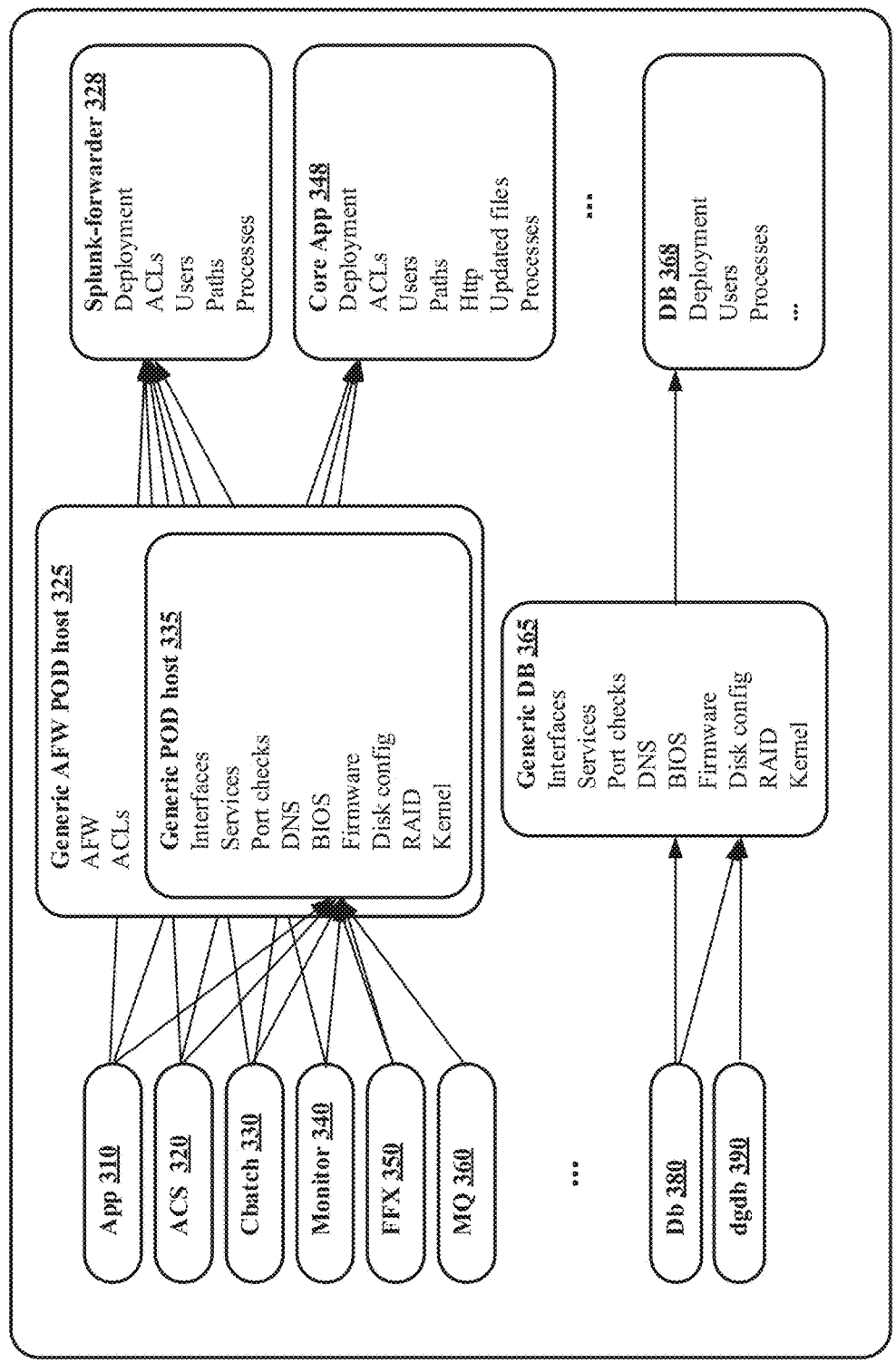
FIG. 3 is an example map illustrating roles and service objects for deployment verification.

FIG. 3 shows an example mapping between a set of roles, systems and processes. Generic automation framework (AFW) pod host 325 includes the AFW and access control lists (ACLs) for generic POD host 335, which includes interfaces, services, port checks, DNS, BIOS, firmware, disk configuration, RAID (redundant array of independent disks—a single logical unit for the purposes of data redundancy and performance improvement) and kernel. In one implementation, an access control list (ACL) check tests connectivity using network sockets between designated source and destination hosts, with source hosts in the same data center as the host from which the scan is executed, and the ACL check will fail if the connection from source to destination times out. Otherwise, the check will pass, including scenarios in which the connection is refused, meaning that the packet got through to a host with no listener.

The mapped system of FIG. 3 also includes roles of app 310 and ACS 320—an API cursor server role which stores the results of database queries, giving the ability to provide a database query cursor in the form of a file, to handle very large queries, and remove some of the load from the database server; cbatch 330 role that hosts customer-specified, scheduled repeated, long-running jobs to offload work from the application server; monitor 340 role, and FFX 350 role used for company-specific servers that store live structured data, generated reports and uploaded files. Additional roles in the example include dgdb 390—data guard database for servers that run data guard processes which are responsible for replication of the primary databases to the corresponding database for disaster recovery service. Additionally, role mq 360 includes hosting an internal queuing system to enable publish and subscribe functionality to be implemented internally within the company's proprietary application.

Also included in the example map shown in FIG. 3 are the definitions of the generic DB host 365 and DB service 368, with DB services for deployment, users and processes—tracking accounts for managing what users should exist on the host and operating system versions for supporting servers. Each process is a service including multiple functional roles. Processes shown in the example map include core app 348 and monitoring agent Splunk-forwarder 328 and can include additional processes. Database server includes DB services, backups, and failover services roles. DB 368 includes deployment, users and processes.

A service definition object model (SDOM) contains definitions of the services that are monitored by watchdog processes. In one implementation the service definitions are expressed in YAML. In another implementation, a different language that implements key-value pairs, such as JSON or XML, can be used. In one example, the SDOM is usable to represent the services in a data center.

An example SDOM file for a service named search is listed next and described in detail. Each service has an associated version, to provide support for multiple versions of the same service to co-exist with potential different validation check requirements. This is version one of this service validation, not to be confused with the version of the deployed application. Services may extend other services. When doing this, they inherit all existing validations and service dependencies of the service being extended, and are able to override or add additional validations or dependencies without impacting the service being extended. In the listed example, the service is installed on all pod hosts with a role of search, as determined via iDB information, and the search service is only defined on pod na31. The "requires" block enumerates the service dependencies and validations that need to be performed. Lines 7-9 in the service file below indicate that a service dependency, specifically on generic host service, which is defined elsewhere. If the version is omitted, any version of the generic host service satisfies the requirement. Version 2 is implicitly an extension of version 1. Alternatively, a service owner could copy and edit version 1 to create version 2, effectively overriding validation aspects of interest.

1. -service:
2. name: search
3. version: 1
4. roles: [search]
5. pods: [na31]
6. requires:
7. -service:
8. name: generichost
9. version: 1
10. -acl:
11. name: 'ACL-19'
12. checkfrequency: daily
13. pattern: 'inventorydb*-*-$dc:443:TCP'
14. -acl:
15. name: 'ACL-20'
16. pattern: 'deployment*-*-$dc:443:TCP'
17. -process:
18. pattern: 'java Solr*'
19. count: 1
20. -deployment:
21. name: 'APP-01'
22. appname: Solr
23. softwareversion: latest
24. -updatedfiles:
25. name: 'HCC-22'
26. path: /var/log/solr/*.log
27. updatedsince: 30 m
28. -updatedfiles:
29. name: 'HCC-21'
30. path: /var/log/jetty/*.log
31. updatedsince: 30 m Validation checks and dependencies for a service need to be limited in scope to the particular instance of that service to function correctly. For example, for an Apache HTTP server listening on port 80, serving pages based on queries from an Oracle database on another server, to run correctly, both the http server and the database server need to be working correctly. The setup for this requirement includes a validation check for the HTTP service check to ensure connection to the remote database—functionality required in order to provide the service. Note that no validation checks for the consuming device need to be included—such as a check that the HTTP server be reachable from some other server. That is, service validation checks apply only to the service itself and its dependent services, and not to the consumers of the service. Consumers of the HTTPD service are assumed to have their own validation checks against the HTTPD service if it is a dependency.

Lines 10-16 of the SDOM file, listed earlier, indicate that there is a requirement for ACL validation. The listed ACL checks are specific to the 'search' service; more generic checks would be included on the host level. An argument for the ACL check is a pattern which will be parsed by the test loader based on data from iDB. The 'name' tag serves a dual purpose to trace back to the underlying validation requirements, and to provide an indicator when extending a service as to whether the validation is an override of the existing test parameters found in the antecedent test objects or a new validation that extends object features found in the antecedent test objects. Lines 17-19 indicate a process check for the search application; the deployment testing system will expect exactly one process that matches the supplied pattern. Lines 20-23 indicates an expectation that the latest version of Solr app is installed, and lines 24-31 include updated files validation checks, which specify an expectation that at least one of the filenames that match the pattern provided have been updated in the past thirty minutes.

The following SDOM file lists an example for generic host services, which is an antecedent test object—defined as a dependent service in the search service SDOM file described earlier. The validations listed in the generic host services file are applicable to hosts that list "generichost" service as a dependency. In the example listed below the check frequency is daily, and the kernel and firmware are included as required deployment tests for a generic host.

1. -service:
2. name: generichost
3. version: 1
4. roles: [acs, app, cbatch, dapp, ffx, indexer, mq, proxy, search]
5. checkfrequency: daily
6. requires:
7. -filechecksum:

8. name: 'OS-01'
9. file: '/etc/sysctl.conf'
10. checksum: 'd41d8cd98f00b204e9800998ecf427e'
11. -device:
12. name: 'HW-01'
13. path: '/sys/bus/scsi/devices'
14. state: 'absent'
15. -kernel:
16. name: 'OS-09'
17. source: 'hwcloudfile'
18. -firmware:
19. name: 'BIOS-04'
20. source: 'hwcloudfile'

The overall object model can include dependencies between services, with an object oriented style inheritance between object classes, as described earlier and in the following use cases.

In one use case, a business utilizes a standardized form of server as the primary unit of hardware, referring to the model as a 'single SKU'. However, business requirements motivate a need to run some complex database servers that include additional memory and disk configuration, but with the same single-SKU hardware. Additionally, a new model needed for research requires even more memory, to enable more effective system scaling, and this research model is only planned for installation on one POD: "na15".

Service objects include attributes which correspond to validation checks for the particular service. A series of three SDOM files that represent hardware, shown next, for the three server models described above, illustrate test object services stored in a database of test objects. The test objects specify aspects of system configuration that include hardware configuration, configuration of run line initialization parameters, modules present in system under test (SUT) storage, and services running on the SUT. Three distinct service files represent hardware—"generic-hardware" depicts the generic Dell service hardware in place across the business, for all roles and all pods; "db-hardware" describes the specific setup for database servers via the role and pods values; and "db-hardware-experimental" lists the specific setup particular to the experimental database hardware via the db role, for pod na15. One example service object attribute is the memory test, which specifies a value of 128 GB of memory for the generic-hardware model, as shown in the SDOM YAML file for generic-hardware listed next. 'Idrac' refers to an integrated remote access controller; 'Ilo' refers to an integrated lights out controller; and 'imlsearch' refers to an integrated management log.

Figure 4:
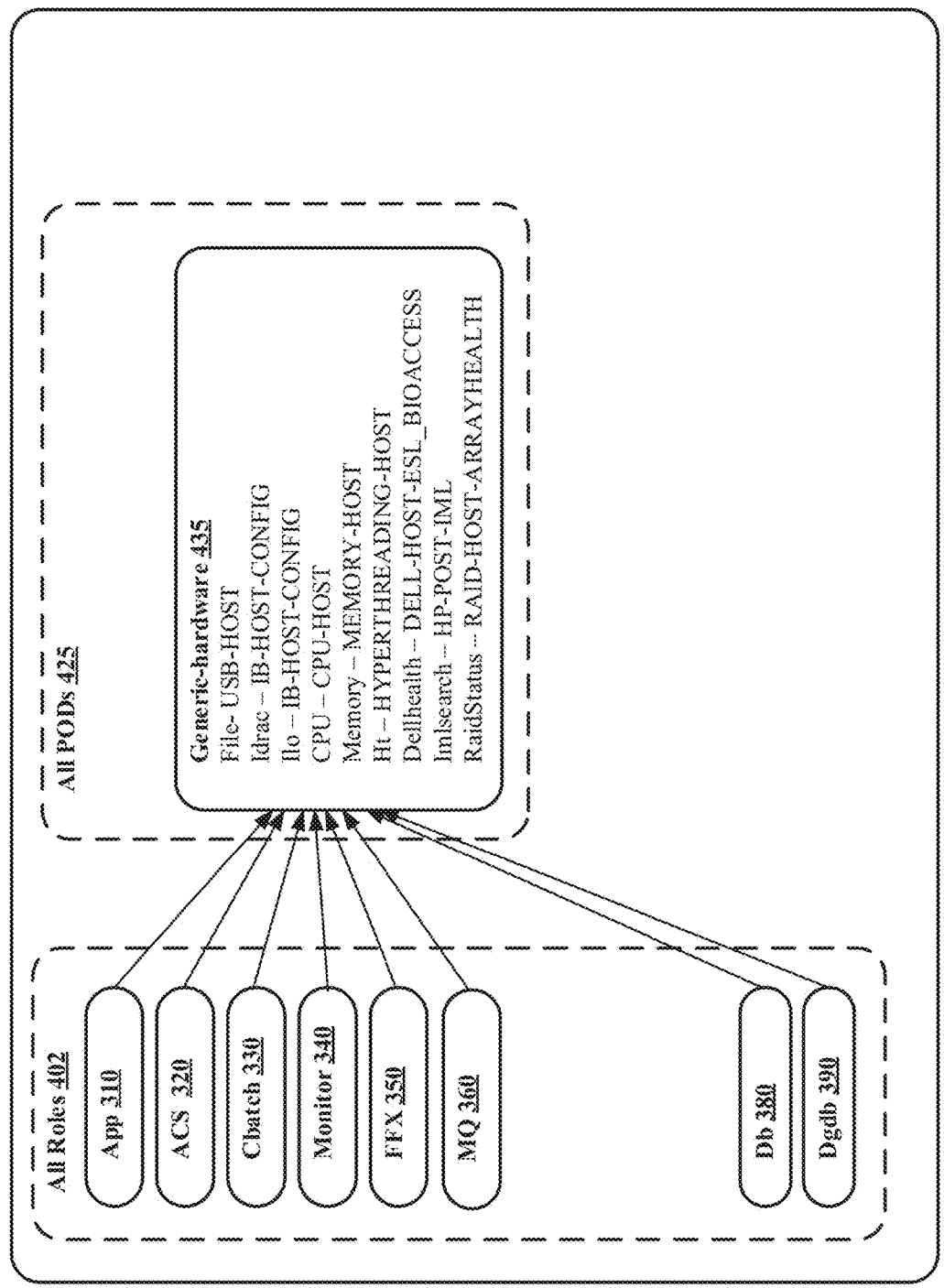
FIG. 4 illustrates one implementation of a generic hardware example map.

FIG. 4 shows an example map for the generic hardware validation checks listed next. All roles 402 map to generic-hardware 435, for all pods 425.

service:
  name: generic-hardware
  version: 2
  roles: [all]
  pods: [all]
  requires:
    file:
      name: 'USB-HOST'
      enabled: 'False'
      filename: '/dev/disk/by-id/usb-(?!HP_iLO_LUN)'
    idrac:
      name: 'IB-HOST-CONFIG'
      sshport: 22
      pwrprofile: "PerfOptimized"
      userlist:
        admin
    ilo:
      name: 'IB-HOST-CONFIG'
      sshport: 22
      userlist:
        admin
    cpu:
      name: 'CPU-HOST'
      operator: '='
      value: '40'
      checkscope: 'local'
    memory:
      name: 'MEMORY-HOST'
      operator: '='
      value: '128'
    ht:
      name: 'HYPERTHREADING-HOST'
    dellhealth:
      name: 'DELL-HOST-ESL BIOSACCESS'
    imlsearch:
      name: 'HP-HOST-IML'
    raidstatus:
      name: 'RAID-HOST-ARRAYHEALTH'

For the second model described in use case one, the SDOM lists the example service name as "db-hardware" and applies only to 'db' roles and applies to all pods. This service definition extends the "generic-hardware" SDOM.

Figure 5:
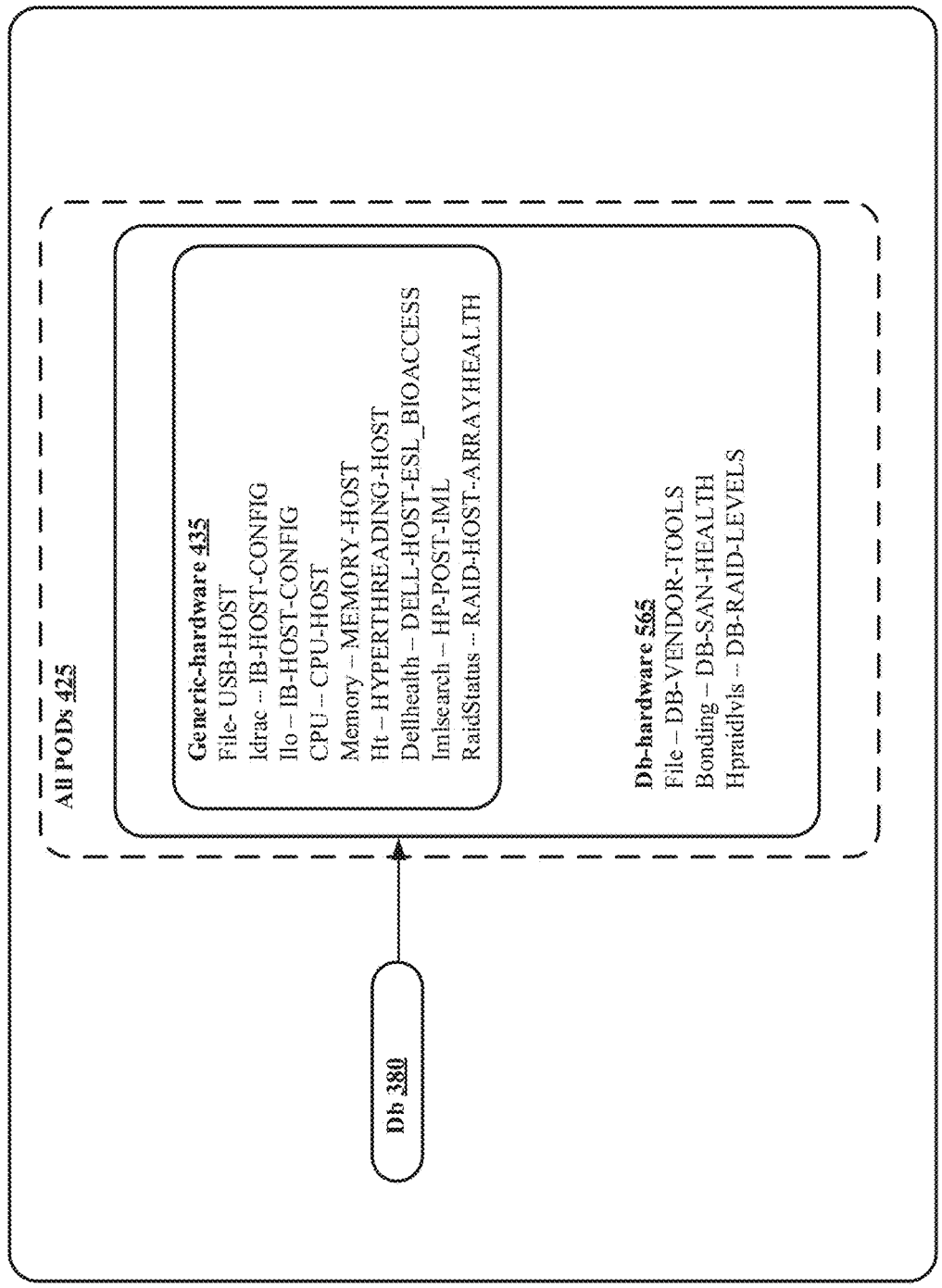
FIG. 5 illustrates one implementation of a database hardware validation test service in which the test objects override the antecedent test objects shown in FIG. 4.

To describe the tolerances specification listed below, for some roles, more than one RAID disk configuration is possible. For the RAID level check in the list below, a single value "1+0" is acceptable for the nested RAID levels. For a different RAID test, a different list of RAID levels could be included. FIG. 5 shows an example map for db-hardware 565 validation checks for the role of db 380, listed next.

service:
  name: db-hardware
  version: 2
  roles: [db]
  pods: [all]
  extends:
    name: generic-hardware
    version: 2
  requires:
    file:
      name: 'DB-VENDOR-TOOLS'
      filename: '/usr/sbin/hpssacli'
    bonding:
      name: 'DB-BOND-HEALTH'
    dbpathchk:
      name: 'DB-SAN-HEALTH'
    hpraidlvls:
      name: 'DB-RAID-LEVELS'
      tolerances:
        "1+0"

Figure 6:
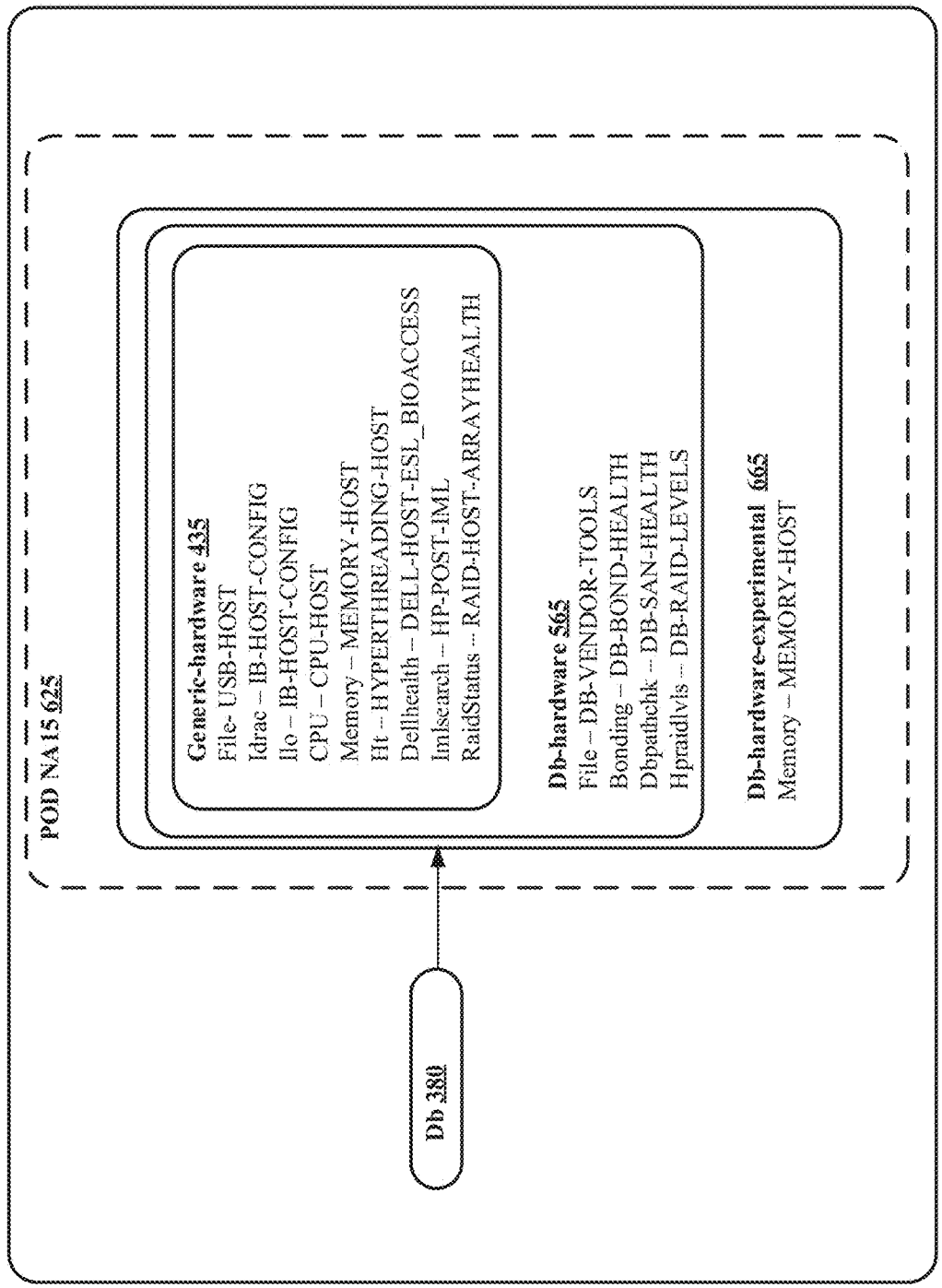
FIG. 6 illustrates an implementation of an experimental database hardware test service in which the test objects override the antecedent test objects shown in FIG. 4 and FIG. 5.

For the experimental model of use case one, "db-hardware-experimental" inherits all check definitions from "db-hardware", which in turn inherits its check definitions from "generic-hardware", so while "db-hardware-experimental" appears to only contain a single check, in fact it contains all of the checks defined in "db-hardware", as well as the checks defined in "generic-hardware—applied to db roles for pod na15. FIG. 6 shows an example map for the db-hardware-experimental 665 validation checks listed next. Because this is includes an "extend" feature, the tests for all pods for generic-hardware 435 and db-hardware 565 are included in the map for db-hardware-experimental 665, for the role of db 380.

```
service:
    name: db-hardware-experimental
    version: 2
    roles: [db]
    pods: [na15]
    extends:
        name: db-hardware
        version: 2
    requires:
        memory:
            name: 'MEMORY-HOST'
            operator: '='
            value: '256'
```

The checks for memory, under the check type 'memory', called 'MEMORYHOST', is defined in two of the service SDOMs, once in generic-hardware and once in db-hardware-experimental. Because the check has the same name in "generic-hardware" and "db-hardware-experimental", the check definition in "db-hardware-experimental" overrides the values of that check provided in generic-hardware. Service object attribute memory test, specifies a value of 256 GB of memory for the "db-hardware-experimental" model, because the experimental POD requires more memory, as described earlier.

For the disclosed configuration system, a test loader loads a selected test object and all antecedent test objects on which the selected test object depends and parses the loaded test objects to prepare a test sequence. In this case, the selected "db-hardware-experimental" test object would incorporate "generic-hardware" and "db-hardware-experimental" as the antecedent test objects on which "db-hardware-experimental" depends: the resultant test sequence example for db-hardware-experimental service is listed next.

```
service:
    name: db-hardware-experimental
    version: 2
    roles: [db]
    pods: [na15]
    requires:
        file:
            name: 'USB-HOST'
            enabled: 'False'
            filename:          '/dev/disk/by-id/usb-
                (?!HP_iLO_LUN)'
            name: 'DB-VENDOR-TOOLS'
            filename: '/usr/sbin/hpssacli'
        idrac:
            name: 'IB-HOST-CONFIG'
            sshport: 22
            pwrprofile: "PerfOptimized"
            userlist:
                admin
        ilo:
            name: 'IB-HOST-CONFIG'
            sshport: 22
            userlist:
                admin
        cpu:
            name: 'CPU-HOST'
            operator: '='
            value: '40'
            checkscope: 'local'
        memory:
            name: 'MEMORY-HOST'
            operator: '='
            value: '256'
        ht:
            name: 'HYPERTHREADING-HOST'
        dellhealth:
            name: 'DELL-HOST-ESL BIOSACCESS'
        imlsearch:
            name: 'HP-HOST-IML'
        raidstatus:
            name: 'RAID-HOST-ARRAYHEALTH'
        bonding:
            name: 'DB-BOND-HEALTH'
        dbpathchk:
            name: 'DB-SAN-HEALTH'
        hpraidlvls:
            name: 'DB-RAID-LEVELS'
            tolerances:
                "1+0"
```

A second use case implements service checks for the version of an application. In this example, a company uses an application called splunk to perform collection and analysis of the log files generated by other applications. A splunk forwarder agent application, installed on every host in the company, is a member of the "app" role, and is configured to send the logs to the centralized splunk server instance for analysis. For one of the company's PODs (na21), a newer version of splunk forwarder agent is installed, which includes additional requirements for checks that need to be performed. The version of splunk-forwarder service to represent the general setup in use case two, listed below, includes a set of checks for app roles for all pods that ensure that the service is running properly—such as making sure the right ports are open, that the correct user exists.

```
service:
    name: 'splunk-forwarder'
    version: 1
    roles: [app]
    pods: [all]
    requires:
        acl:
            name: 'ACL-SPLUNK-LOGSEARCH'
            checkfrequency: 1d
            hostpattern:        'shared[0-9]?-logsearch[0-9]
                ?.*<dc>.ops.sfdc.net'
            portlist: [8869,8879,8889]
            protocol: 'TCP'
        process:
            name: 'PROCESS-SPLUNK'
            cmdlinepattern: 'splunkd-p [0-9]+start'
            count: 1
        user:
            name: 'USER-SPLUNK'
            username: 'appmon'
        listener:
            name: 'LISTENER-SPLUNK'
            portlist: [<pripodjmx>]
            protocol: 'TCP'
        file:
            name: 'FILEPERM-SPLUNK'
            user: 'appmon'
            group: 'sfdc'
            perms: '-755'
            filename:       '/home/appmon/splunkcommon/var/
                log/splunk'
```

Continuing with use case two, the new SDOM is listed below—to cover the newer splunk-forwarder version installed—a second version of the splunk-forward service, which includes additional requirements for checks that need to be performed for the na21 pod. Version two of the service for splunk-forwarder is installed for app roles, but only on na21. The new service only requires port 8889 instead of ports 8869, 8879 and 8889 as listed above in version one of the service. Additionally the process has a different name, splunkforwarderd rather than the original process splunkd for version one.

service:
   name: 'splunk-forwarder'
   version: 2
   roles: [app]
   pods: [na21]
   extends:
     name: splunk-forwarder
     version: 1
   requires:
     acl:
       name: 'ACL-SPLUNK-LOGSEARCH'
       checkfrequency: 1d
       hostpattern: 'shared[0-9]?-logsearch[0-9]?.*<dc>.ops.sfdc.net'
       portlist: [8889]
       protocol: 'TCP'
     process:
       name: 'PROCESS-SPLUNK'
       cmdlinepattern: 'splunkforwarderd-p [0-9]+start'
       count: 1

Test loader/parser 147 loads the selected test object and all antecedent test objects on which the selected test object depends and parses the loaded test objects to prepare the test sequence. In this case, the selected "splunk-forwarder" test object would incorporate version one as the antecedent test object for na21, specify test parameter values that extend the values found in the antecedent test object for the aspects of system configuration, and override test parameter values found in the version one antecedent test object. The resultant test sequence for na21 is listed next.

service:
   name: 'splunk-forwarder'
   version: 2
   roles: [app]
   pods: [na21]
   requires:
     acl:
       name: 'ACL-SPLUNK-LOGSEARCH'
       checkfrequency: 1d
       hostpattern: 'shared[0-9]?-logsearch[0-9]?.*<dc>.ops.sfdc.net'
       portlist: [8889]
       protocol: 'TCP'
     process:
       name: 'PROCESS-SPLUNK'
       cmdlinepattern: 'splunkforwarderd-p [0-9]+start'
       count: 1
     user:
       name: 'USER-SPLUNK'
       username: 'appmon'
     listener:
       name: 'LISTENER-SPLUNK'
       portlist: [<pripodjmx>]
       protocol: 'TCP'
     file:
       name: 'FILEPERM-SPLUNK'
       user: 'appmon'
       group: 'sfdc'
       perms: '-755'
       filename: '/home/appmon/splunkcommon/var/log/splunk'

The SDOM files include the validation attributes, and the test loader 147 parses the loaded test objects to make individual process configuration files for test executor 136, for each of the systems under test. The individual files are configured to satisfy criteria in the test and antecedent test objects, and based on the appropriate sources of truth for the system, such as the inventory database (iDB) which contains the logical infrastructure equipment for a data center.

Test executor 136 obtains administrative credentials for accessing and testing the SUT and uses the test and antecedent test objects to verify hardware configuration of the SUT, active connection of the SUT to other network devices, configuration of the actively connected network devices to accept access by the SUT, presence of files and applications in storage of the SUT, and services running on the SUT. In one implementation, test executor 136 runs the test sequence at boot time and can be set to run on a regular frequency—in one case, every five minutes. The test sequence executes autonomously and the results are reported to a report collector and stored in a big data pool. In one implementation, test executor 136 runs as a python agent process, which runs on each host. The process can be distributed in RPM format in a central repository. Other implementations can use another programming language such as Java or C++. Communication with the process can be in the form of https web service calls. Test executor 136 reads the declarative configuration file and completes the procedural checks for the SUT.

In some cases, a watcher service on a client device reports results for the SUT, using the results stored, using a central aggregator accepting tester results, in the big data pool. The watcher service consolidates and displays the validation results, and could include notifications and alarms displayed for human consumption. The test reporter information can include visible drilldown to the details for a given service. In one example implementation, the test reporter can subscribe to certain sets of services in order to use only the information it needs. For example, a data center automation may only be interested in top-level service health, and not individual pod health. Alternatively, a validator for pod build scenarios would be interested in lower-level services, depending on the pod build stage. The disclosed flexible and open design enables service owners to choose what ways to use the published tester results.

FIG. 7 shows an excerpt from an aggregated list of checks, by name, type, service and roles. Each row in the list represents a single validation check, including ACL checks, UPC checks, BIOS checks, hardware checks, operating system checks and other miscellaneous (MSC) checks such as checking small computer system interface (SCSI) tuning and timeout settings on DB hosts, for ensuring adequate disk I/O performance. Additional columns can include validation results for the individual checks.

The disclosed deployment testing system includes the ability for service owners to add their own validation checks to the test executor, by implementing a watchdog validation module API which ensures that the validation tests are read-only, with no data or credentials stored as part of the configuration.

For the disclosed system, the validation tests can be set up to run regularly over the lifecycle of the hosts, from provisioning to decommissioning, and the test reporter can utilize stored validation test results instead of running specific validation tests for the build phase, the deploy phase, an internal go live phase and an external go-live phase. While the watchdog results are binary—healthy or unhealthy—several values for any given data point can often be deemed healthy. For example, for an application X, versions two or three can be acceptable, while version 1 has a security issue so is not an acceptable version. Also, during a rolling deployment of application version X, versions two, three or four could be acceptable until the full deployment is completed.

Workflow

Figure 8:
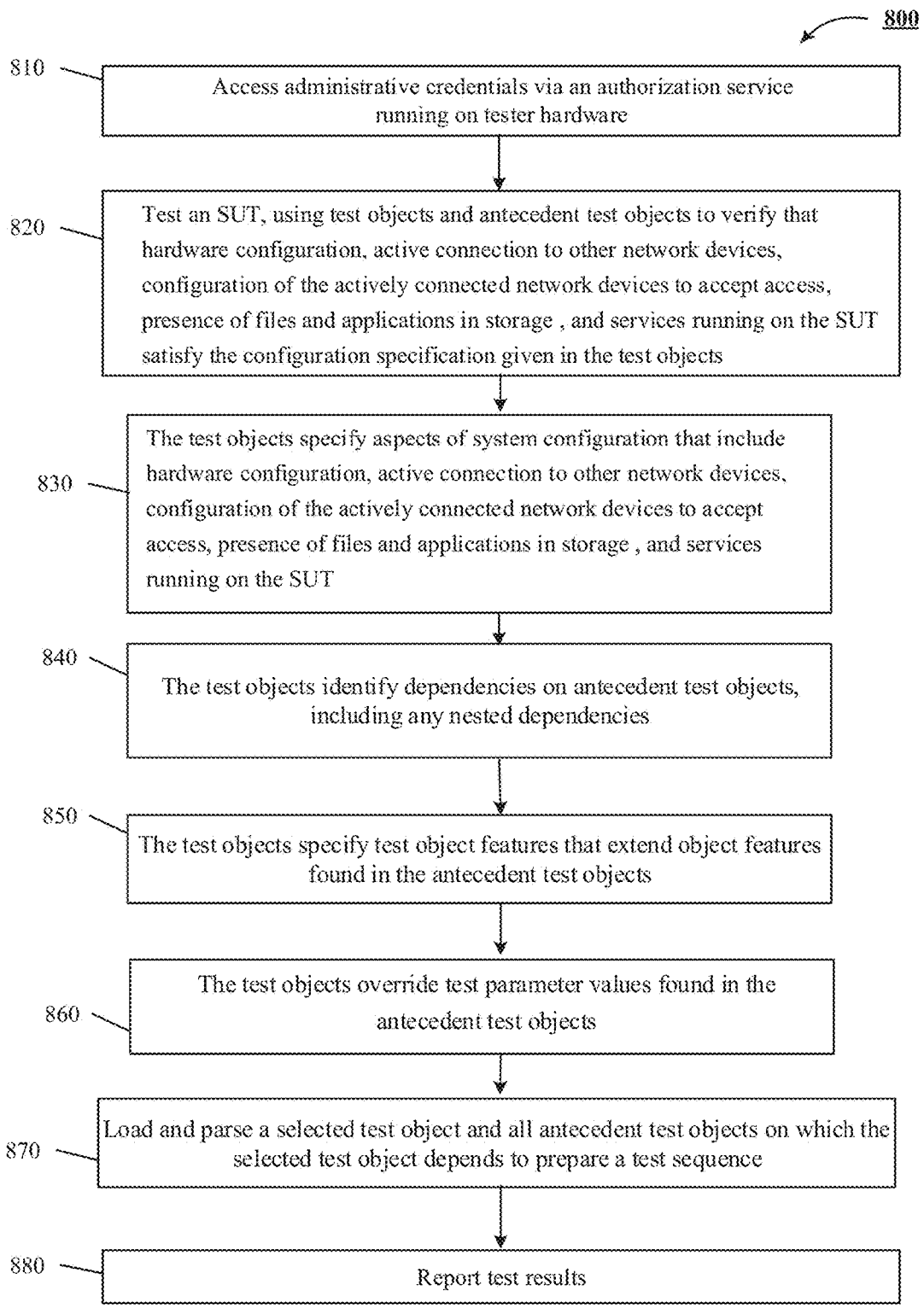
FIG. 8 shows one implementation of a flowchart of a deployment testing method.

FIG. 8 shows one implementation of a flowchart 800 of a method of deployment testing. Flowchart 800 can be implemented at least partially with a computer or other data processing system, e.g., by one or more processors configured to receive or retrieve information, process the information, store results, and transmit the results. For convenience, this workflow is described with reference to the system that carries out a method. The system is not necessarily part of the method.

At action 810, the method includes running, on tester hardware, an authorization service that accesses administrative credentials.

At action 820, the method includes testing, using the tester hardware, a service under test, abbreviated SUT, using a plurality of test objects and antecedent test objects to verify that hardware configuration of the SUT, active connection of the SUT to other network devices, configuration of the actively connected network devices to accept access by the SUT, presence of files and applications in storage of the SUT, and services running on the SUT satisfy the configuration specification given in the test objects.

At action 830, the method includes test objects that specify aspects of system configuration that include hardware configuration of the SUT, active connection of the SUT to other network devices, configuration of the actively connected network devices to accept access by the SUT, presence of files and applications in storage of the SUT, and services running on the SUT.

At action 840, the test objects identify dependencies on antecedent test objects, including any nested dependencies.

At action 850, the test objects specify test object features that extend object features found in the antecedent test objects.

At action 860, the test objects override test parameter values found in the antecedent test objects.

At action 870, the method includes loading and parsing a selected test object and all antecedent test objects on which the selected test object depends to prepare a test sequence.

At action 880, the method includes reporting test results.

Other implementations may perform the actions in different orders and/or with different, fewer or additional actions than those illustrated in FIG. 8. Multiple actions can be combined in some implementations.

Multi-Tenant Integration

Figure 9:
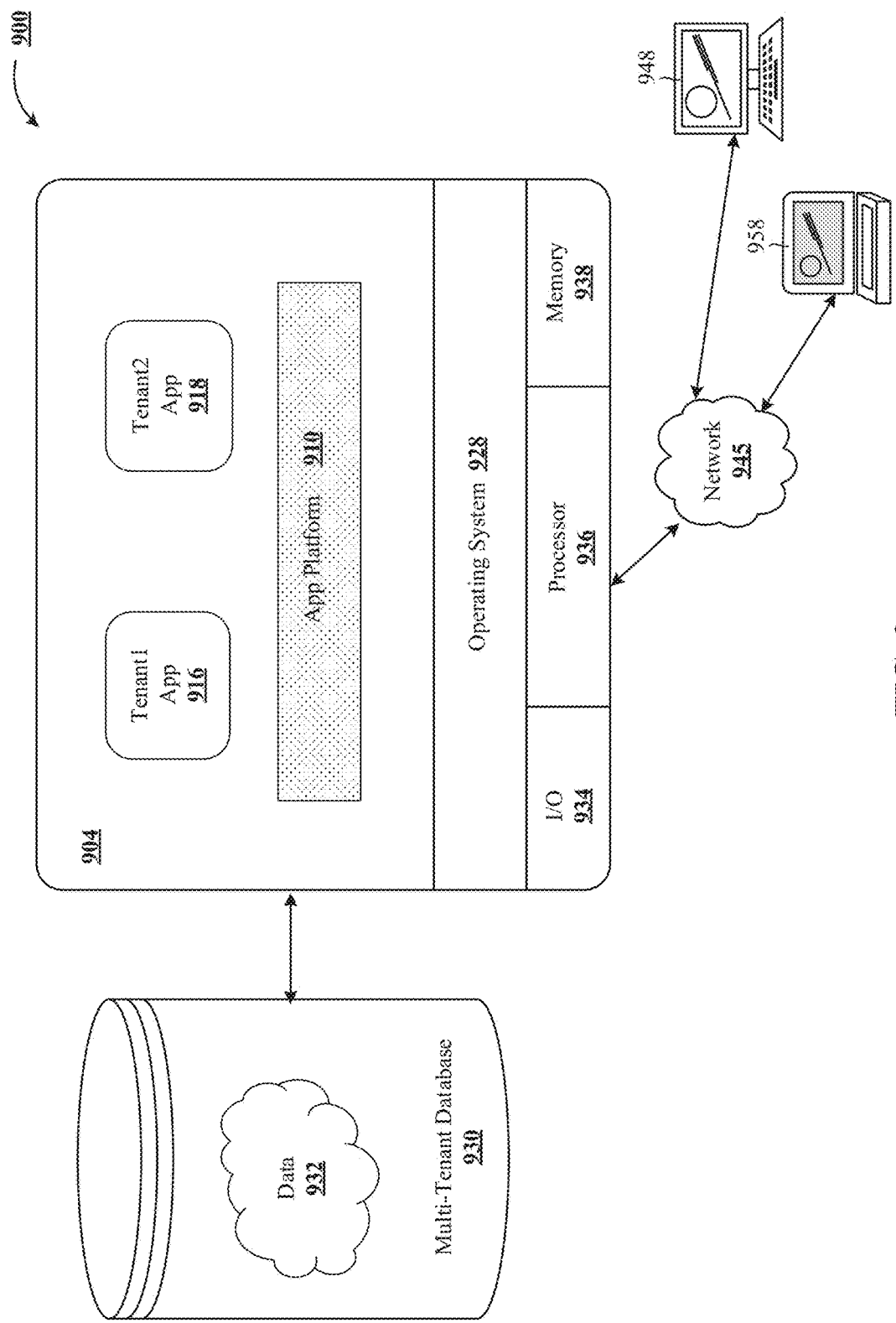
FIG. 9 is a block diagram of an exemplary multi-tenant system suitable for integration with the deployment testing system of FIG. 1 in accordance with one or more implementations of the technology disclosed.

FIG. 9 presents a block diagram of an exemplary multi-tenant system 900 suitable for integration with the deployment testing system environment 100 of FIG. 1. In general, the illustrated multi-tenant system 900 of FIG. 9 includes a server 904 that dynamically creates and supports applications 916 and 918, based upon data 932 from a common database 930 that is shared between multiple tenants, alternatively referred to herein as a "multi-tenant database". Data and services generated by the applications 916 and 918, including GUI clients, are provided via a network 945 to any number of client devices 948 or 958, as desired.

As used herein, a "tenant" or an "organization" refers to a group of one or more users that shares access to common subset of the data within the multi-tenant database 930. In this regard, each tenant includes one or more users associated with, assigned to, or otherwise belonging to that respective tenant. Stated another way, each respective user within the multi-tenant system 900 is associated with, assigned to, or otherwise belongs to a particular tenant of the plurality of tenants supported by the multi-tenant system 900. Tenants may represent users, user departments, work or legal organizations, and/or any other entities that maintain data for particular sets of users within the multi-tenant system 900. Although multiple tenants may share access to the server 904 and the database 930, the particular data and services provided from the server 904 to each tenant can be securely isolated from those provided to other tenants. The multi-tenant architecture therefore allows different sets of users to share functionality and hardware resources without necessarily sharing any of the data 932 belonging to or otherwise associated with other tenants.

The multi-tenant database 930 is any sort of repository or other data storage system capable of storing and managing the data 932 associated with any number of tenants. The database 930 may be implemented using any type of conventional database server hardware. In various implementations, the database 930 shares processing hardware with the server 904. In other implementations, the database 930 is implemented using separate physical and/or virtual database server hardware that communicates with the server 904 to perform the various functions described herein. The multi-tenant database 930 may alternatively be referred to herein as an on-demand database, in that the multi-tenant database 930 provides (or is available to provide) data at run-time to on-demand applications 916 or 918 generated by the application platform 910.

In practice, the data 932 may be organized and formatted in any manner to support the application platform 910. In various implementations, conventional data relationships are established using any number of pivot tables that establish indexing, uniqueness, relationships between entities, and/or other aspects of conventional database organization as desired.

The server 904 is implemented using one or more actual and/or virtual computing systems that collectively provide the dynamic application platform 910 for generating the virtual applications. For example, the server 904 may be implemented using a cluster of actual and/or virtual servers operating in conjunction with each other, typically in association with conventional network communications, cluster management, load balancing and other features as appropriate. The server 904 operates with any sort of conventional processing hardware such as a processor 936, memory 938, input/output features 934 and the like. The input/output features 934 generally represent the interface(s) to networks (e.g., to the network 945, or any other local area, wide area or other network), mass storage, display devices, data entry devices and/or the like. The processor 936 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 938 represents any non-transitory short or long term storage or other computer-readable media capable of storing programming instructions for execution on the processor 936, including any sort of random access memory (RAM), read only memory (ROM), flash memory, magnetic or optical mass storage, and/or the like. The computer-executable programming instructions, when read and executed by the server 904 and/or processor 936, cause the server 904 and/or processor 936 to create, generate, or otherwise facilitate the application platform 910 and/or virtual applications 916 and 918, and perform one or more additional tasks, operations, functions, and/or processes described herein. It should be noted that the memory 938 represents one suitable implementation of such computer-readable media, and alternatively or additionally, the server 904 could receive and cooperate with external computer-readable media that is realized as a portable or mobile component or application platform, e.g., a portable hard drive, a USB flash drive, an optical disc, or the like.

The application platform 910 is any sort of software application or other data processing engine that generates the virtual applications 916 and 918 that provide data and/or services to the client devices 948 and 958. In a typical implementation, the application platform 910 gains access to processing resources, communications interfaces and other features of the processing hardware using any sort of conventional or proprietary operating system 908. The virtual applications 916 and 918 are typically generated at run-time in response to input received from the client devices 948 and 958.

With continued reference to FIG. 9, the data and services provided by the server 904 can be retrieved using any sort of personal computer, mobile telephone, tablet or other network-enabled client device 948 or 958 on the network 945. In an exemplary implementation, the client device 948 or 958 includes a display device, such as a monitor, screen, or another conventional electronic display capable of graphically presenting data and/or information retrieved from the multi-tenant database 930.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Some Particular Implementations

Some particular implementations and features are described in the following discussion.

The technology disclosed, in one implementation, describes a deployment testing system coupled to a network and at least dozens of computer systems, with the deployment testing system including a test loader that loads a selected test object and all antecedent test objects on which the selected test object depends and that parses the loaded test objects to prepare a test sequence. The system also includes a database of test objects, wherein the test objects apply to one or more systems under test (abbreviated SUT) and specify aspects of deployed SUT configuration that include hardware configuration of the SUT, configuration of actively connected network devices by the SUT to other network devices, configuration of the actively connected network devices to accept access by the SUT, presence of files and applications in storage of the SUT, and services running on the SUT; identify dependencies on antecedent test objects, including any nested dependencies; specify test object features that extend object features found in the antecedent test objects; and override test parameter values found in the antecedent test objects. The disclosed system further includes a test executor that obtains administrative credentials for accessing and testing a SUT and uses a plurality of the test and antecedent test objects to verify that hardware configuration of the SUT, active connection of the SUT to other network devices, configuration of the actively connected network devices to accept access by the SUT, presence of files and applications in storage of the SUT, and services running on the SUT; and includes a test reporter that publishes tester results, for consumption, that satisfy criteria in the test and antecedent test objects.

In some implementations of the system, the test objects further identify systems by at least one service role performed by the systems, to which the test object applies and the test executor obtains administrative credentials for and verifies the identified system service role. The disclosed system can further include reporting the results to a watcher service on a client device.

In one implementation, the test objects further identify at least one cluster of systems to which the test object applies and the test executor obtains administrative credentials for and verifies the identified cluster of systems. In some implementations, the test objects further identify data centers to which the test object applies and the test executor obtains administrative credentials for and verifies systems in the identified data center. In yet another disclosed implementation, the test objects further specify configuration of service initialization parameters for services installed on the SUT.

The disclosed system further includes a subscriber service that accesses the published tester results for the SUT described by configuration specifications and that accesses the published tester results for the SUT described by the configuration specification.

In one implementation, a disclosed method of deployment testing includes running, on tester hardware, an authorization service that accesses administrative credentials; testing, using the tester hardware, a service under test, abbreviated SUT, using a plurality of test objects and antecedent test objects to verify that hardware configuration of the SUT, active connection of the SUT to other network devices, configuration of the actively connected network devices to accept access by the SUT, presence of files and applications in storage of the SUT, and services running on the SUT satisfy the configuration specification given in the test objects. The test objects specify aspects of system configuration that include hardware configuration of the SUT, active connection of the SUT to other network devices, configuration of the actively connected network devices to accept access by the SUT, presence of files and applications in storage of the SUT, and services running on the SUT; identify dependencies on antecedent test objects, including any nested dependencies; specify test object features that extend object features found in the antecedent test objects; and override test parameter values found in the antecedent test objects. The disclosed method also includes loading and parsing a selected test object and all antecedent test objects on which the selected test object depends to prepare a test sequence; running the test sequence; and reporting test results.

The method described in this section can include one or more of the following features and/or features described in connection the system disclosed. In the interest of conciseness, the combinations of features disclosed in this application are not individually enumerated and are not repeated with each base set of features.

For the disclosed method, the test objects further identify systems, by at least one service role performed by the systems, to which the test object applies and the test executor obtains administrative credentials for and verifies the identified system service role. The test objects can also identify at least one cluster of systems to which the test object applies and the test executor obtains administrative credentials for and verifies the identified cluster of systems. The test objects can further identify data centers to which the test object applies and the test executor obtains administrative credentials for and verifies systems in the identified data center. For the disclosed method, the test objects further specify configuration of service initialization parameters for services installed on the SUT. The method can further include a subscriber service that accesses the published tester results for the SUT described by the configuration specification. In some implementations the disclosed method includes reporting the results to a watcher service on a client device.

Other implementations of the method described in this section can include a computing system including one or more servers comprising one or more processors and memory, coupled to the processors, containing computer instructions that, when executed on the processors, cause the computing system to carry out the method of deployment testing described supra.

Other implementations may include one or more tangible non-transitory computer readable media impressed with instructions that are combinable with a processor and memory coupled to the processor. The instructions, when executed on a computer device and one or more servers, perform any of the methods described earlier. In yet other implementations, one or more tangible non-transitory computer readable media with instructions that are combinable with a processor and memory coupled to the processor carry out the systems described earlier.

The terms and expressions employed herein are used as terms and expressions of description and not of limitation, and there is no intention, in the use of such terms and expressions, of excluding any equivalents of the features shown and described or portions thereof.

While the technology disclosed is disclosed by reference to the preferred embodiments and examples detailed above, it is to be understood that these examples are intended in an illustrative rather than in a limiting sense. Accordingly, the described implementations are to be considered in all respects as only illustrative and not restrictive. In addition, having described certain implementations of the technology disclosed, it is contemplated that modifications and combinations will readily occur to those of ordinary skill in the art. Other implementations incorporating the concepts disclosed herein can be used without departing from the spirit of the innovation and scope of the following claims.

What is claimed is:

1. A deployment testing system coupled to a computer network, the deployment testing system comprising:
   a memory, and
   at least one processor coupled to the memory, wherein the at least one processor is configured to:
   obtain administrative credentials to access and test at least one system under test (SUT);
   load a selected test object and antecedent test objects on which the selected test object depends from a test object database of a plurality of sets of test objects and respective antecedent test objects,
     wherein the plurality of sets of test objects and respective antecedent test objects comprise configuration parameters of the at least one SUT, and
     wherein the configuration parameters are configured to validate the at least one SUT;
   parse the selected test object and the antecedent test objects that are loaded;
   build a test sequence using the selected test object and the antecedent test objects as parsed;
     wherein to build the test sequence, the at least one processor is further configured to:
       identify dependencies on the parsed antecedent test objects, including nested dependencies; and
       extend first object features of the parsed selected test object with second object features of the parsed antecedent test objects, comprising:
         overriding at least one first object feature of the first object features with test parameter values from the second object features; and
         inheriting the dependencies on the parsed antecedent test objects, including the nested dependencies, into the first object features as additional test parameter values;
   run the test sequence to verify the configuration parameters of the at least one SUT using the extended first object features having the test parameter values and the additional test parameter values; and
   provide results of the run of the test sequence.

2. The deployment testing system of claim 1, wherein the at least one processor is further configured to:
   identify, using the plurality of sets of test objects and respective antecedent test objects, a target SUT of the at least one SUT by at least one service role performed by the target SUT; and
   verify the at least one service role of the target SUT.

3. The deployment testing system of claim 1, wherein the at least one processor is further configured to:
   provide the results of the run of the test sequence to a watcher service on a client device.

4. The deployment testing system of claim 1, wherein the at least one processor is further configured to:
 identify, using the plurality of sets of test objects and respective antecedent test objects, a cluster of systems under test of the at least one SUT; and
 verify the identified cluster of systems under test.

5. The deployment testing system of claim 1, wherein the at least one processor is further configured to:
 identify, using the plurality of sets of test objects and respective antecedent test objects, a data center; and
 verify the at least one SUT in the identified data center.

6. The deployment testing system of claim 1, wherein the configuration parameters comprise data specifying a plurality of hardware configurations of the at least one SUT, a plurality of active connections of the at least one SUT to other network devices, a plurality of configurations of actively connected network devices to accept access by the at least one SUT, identification of files and applications in storage of the at least one SUT, identification of services installed on the at least one SUT, or a plurality of configurations of service initialization parameters for the services installed on the at least one SUT.

7. The deployment testing system of claim 1, wherein the at least one processor is further configured to:
 communicate with a subscriber service to access the results of the run of the test sequence.

8. A method of deployment testing of at least one system under test (SUT) of a computer network, the method comprising:
 obtaining administrative credentials from an authorization service to access and test the at least one SUT;
 loading a selected test object and antecedent test objects on which the selected test object depends from a test object database of a plurality of sets of test objects and respective antecedent test objects,
  wherein the plurality of sets of test objects and respective antecedent test objects comprise configuration parameters of the at least one SUT, and
  wherein the configuration parameters are configured to validate the at least one SUT;
 parsing the selected test object and the antecedent test objects that are loaded;
 building a test sequence using the selected test object and the antecedent test objects as parsed;
  wherein building the test sequence further comprises:
   identifying dependencies on the parsed antecedent test objects, including nested dependencies; and
   extending first object features of the parsed selected test object with second object features of the parsed antecedent test objects, wherein the extending comprises:
    overriding at least one first object feature of the first object features with test parameter values from the second object features; and
    inheriting the dependencies on the parsed antecedent test objects, including the nested dependencies, into the first object features as additional test parameter values;
 running the test sequence to verify the configuration parameters of the at least one SUT using the extended first object features having the test parameter values and the additional test parameter values; and
 providing results of the run of the test sequence.

9. The method of claim 8, further comprising:
 identifying, using the plurality of sets of test objects and respective antecedent test objects, a target SUT of the at least one SUT by at least one service role performed by the target SUT; and
 verifying the at least one service role of the target SUT.

10. The method of claim 8, further comprising:
 identifying, using the plurality of sets of test objects and respective antecedent test objects, a cluster of systems under test of the at least one SUT; and
 verifying the identified cluster of systems under test.

11. The method of claim 8, further comprising:
 identifying, using the plurality of sets of test objects and respective antecedent test objects, a data center; and
 verifying the at least one SUT in the identified data center.

12. The method of claim 8, wherein the configuration parameters comprise data specifying a plurality of hardware configurations of the at least one SUT, a plurality of active connections of the at least one SUT to other network devices, a plurality of configurations of actively connected network devices to accept access by the at least one SUT, identification of files and applications in storage of the at least one SUT, identification of services installed on the at least one SUT, or a plurality of configurations of service initialization parameters for the services installed on the at least one SUT.

13. The method of claim 8, further comprising:
 communicating with a subscriber service to access the results of the run of the test sequence.

14. The method of claim 8, further comprising:
 providing the results of the run of the test sequence to a watcher service on a client device.

15. A tangible non-transitory computer-readable device having instructions stored thereon that, when executed by a computing device, cause the computing device to perform operations comprising:
 obtaining administrative credentials from an authorization service to access and test at least one system under test (SUT) of a computer network;
 loading a selected test object and antecedent test objects on which the selected test object depends from a test object database of a plurality of sets of test objects and respective antecedent test objects,
  wherein the plurality of sets of test objects and respective antecedent test objects comprise configuration parameters of the at least one SUT, and
  wherein the configuration parameters are configured to validate the at least one SUT;
 parsing the selected test object and the antecedent test objects that are loaded;
 building a test sequence using the selected test object and the antecedent test objects as parsed;
  wherein building the test sequence further comprises:
   identifying dependencies on the parsed antecedent test objects, including nested dependencies; and
   extending first object features of the parsed selected test object with second object features of the parsed antecedent test objects, wherein the extending comprises:
    overriding at least one first object feature of the first object features with test parameter values from the second object features; and
    inheriting the dependencies on the parsed antecedent test objects, including the nested dependencies, into the first object features as additional test parameter values;

running the test sequence to verify the configuration parameters of the at least one SUT using the extended first object features having the test parameter values and the additional test parameter values; and providing results of the run of the test sequence.

16. The computer-readable device of claim 15, the operations performed by the computing device further comprising:

identifying, using the plurality of sets of test objects and respective antecedent test objects, a target SUT of the at least one SUT by at least one service role performed by the target SUT; and verifying the at least one service role of the target SUT.

17. The computer-readable device of claim 15, the operations performed by the computing device further comprising:

identifying, using the plurality of sets of test objects and respective antecedent test objects, a cluster of systems under test of the at least one SUT; and verifying the identified cluster of systems under test.

18. The computer-readable device of claim 15, the operations performed by the computing device further comprising:

identifying, using the plurality of sets of test objects and respective antecedent test objects, a data center; and verifying the at least one SUT in the identified data center.

19. The computer-readable device of claim 15, wherein the configuration parameters comprise data specifying a plurality of hardware configurations of the at least one SUT, a plurality of active connections of the at least one SUT to other network devices, a plurality of configurations of actively connected network devices to accept access by the at least one SUT, identification of files and applications in storage of the at least one SUT, identification of services installed on the at least one SUT, or a plurality of configurations of service initialization parameters for the services installed on the at least one SUT.

20. The computer-readable device of claim 15, the operations performed by the computing device further comprising:

communicating with a subscriber service to access the results of the run of the test sequence.

21. The computer-readable device of claim 15, the operations performed by the computing device further comprising:

providing the results of the run of the test sequence to a watcher service on a client device.

* * * * *